(12) United States Patent
Oiwa et al.

(10) Patent No.: US 11,267,728 B2
(45) Date of Patent: Mar. 8, 2022

(54) ALKALINE WATER ELECTROLYSIS DEVICE

(71) Applicants: thyssenkrupp Uhde Chlorine Engineers (Japan) Ltd., Tokyo (JP); KAWASAKI JUKOGYO KABUSHIKI KAISHA, Kobe (JP)

(72) Inventors: Takehiro Oiwa, Tamano (JP); Koji Kawanishi, Tamano (JP); Kenichiro Igashira, Akashi (JP); Yuji Kamei, Akashi (JP); Nanase Ishikawa, Akashi (JP); Akiyoshi Manabe, Fujisawa (JP)

(73) Assignees: THYSSENKRUPP UHDE CHLORINE ENGINEERS (JAPAN) LTD., Tokyo (JP); KAWASAKI JUKOGYO KABUSHIKI KAISHA, Kobe (JP)

( * ) Notice: Subject to any disclaimer, the term of this patent is extended or adjusted under 35 U.S.C. 154(b) by 209 days.

(21) Appl. No.: 16/499,064

(22) PCT Filed: Mar. 28, 2018

(86) PCT No.: PCT/JP2018/013044
§ 371 (c)(1),
(2) Date: Sep. 27, 2019

(87) PCT Pub. No.: WO2018/181617
PCT Pub. Date: Oct. 4, 2018

(65) Prior Publication Data
US 2020/0039848 A1 Feb. 6, 2020

(30) Foreign Application Priority Data

Mar. 29, 2017 (JP) .............................. JP2017-066276

(51) Int. Cl.
*C25B 1/04* (2021.01)
*C02F 1/46* (2006.01)
(Continued)

(52) U.S. Cl.
CPC .............. *C02F 1/4604* (2013.01); *C25B 9/19* (2021.01); *C25B 13/02* (2013.01); *C02F 2001/4619* (2013.01); *C02F 2001/46142* (2013.01)

(58) Field of Classification Search
CPC .... C25B 9/19; C25B 1/04; C25B 9/73; C25B 9/23; C25B 9/00; C25B 9/70; C25B 9/63;
(Continued)

(56) References Cited

U.S. PATENT DOCUMENTS 4,898,653 A 2/1990 Morris
6,080,290 A 6/2000 Stuart et al.
(Continued)

FOREIGN PATENT DOCUMENTS

CA 2 276 444 A1 7/1998
EP 1016737 A1 7/2000
(Continued)

OTHER PUBLICATIONS

Canadian Office Action for corresponding Canadian Application No. 3,054,542, dated Apr. 20, 2021.
(Continued)

*Primary Examiner* — Zulmariam Mendez
(74) *Attorney, Agent, or Firm* — Birch, Stewart, Kolasch & Birch, LLP

(57) ABSTRACT

Provided is an alkaline water electrolyzer in which leakage of aqueous alkali solutions is prevented.
The alkaline water electrolyzer 10 includes an anode chamber frame 11 defining an anode chamber 12; a cathode chamber frame 17 defining a cathode chamber 18; a porous
(Continued)

diaphragm 16 disposed between the anode and cathode chamber frames 11 and 17 and partitioning the anode and cathode chambers 12 and 18; an anode gasket 15 disposed on the anode chamber frame 11; and a cathode gasket 21 disposed on the cathode chamber frame 17, wherein when the anode and cathode chamber frames 11 and 17 are fastened, the porous diaphragm 16 is held between the anode and cathode chamber frames 11 and 17 via the anode and cathode gaskets 15 and 21 and the anode and cathode gaskets 15 and 21 are in contact with each other around the peripheral edge of the porous diaphragm 16 by compressing the anode and cathode gaskets 15 and 21.

1 Claim, 2 Drawing Sheets

(51) Int. Cl.
  *C25B 13/02* (2006.01)
  *C25B 9/19* (2021.01)
  *C02F 1/461* (2006.01)
(58) Field of Classification Search
  CPC ......... C25B 11/00; C25B 13/00; C25B 15/00; C25B 9/40
  See application file for complete search history.

(56) References Cited

U.S. PATENT DOCUMENTS

| 6,156,166 A | 12/2000 | Koganezawa et al. |
| 2015/0027878 A1 | 1/2015 | Funakawa et al. |
| 2018/0073155 A1 | 3/2018 | Suzuki et al. |

FOREIGN PATENT DOCUMENTS

| JP | 61-56290 A | 3/1986 |
| JP | 63-216990 A | 9/1988 |
| JP | 5-9772 A | 1/1993 |
| JP | 2012-193437 A | 10/2012 |
| JP | 2014-221944 A | 11/2014 |
| WO | WO 92/22096 A2 | 12/1992 |
| WO | WO 2016/148302 A1 | 9/2016 |

OTHER PUBLICATIONS

Extended European Search Report for European Application No. 18776269.5, dated Dec. 11, 2020.
International Search Report (PCT/ISA/210) issued in PCT/JP2018/013044, dated May 22, 2018.
Written Opinion of the International Searching Authority (PCT/ISA/237) issued in PCT/JP2018/013044, dated May 22, 2018.

ALKALINE WATER ELECTROLYSIS DEVICE

TECHNICAL FIELD

The present invention relates to an alkaline water electrolyzer and more specifically to an alkaline water electrolyzer equipped with a porous diaphragm in such a way that leakage of aqueous alkali solutions is prevented.

BACKGROUND ART

A known electrolysis cell for use in alkaline water electrolysis or electrolysis of aqueous alkali metal salt solutions (e.g., brine electrolysis) has a structure in which a diaphragm is disposed between an anode chamber and a cathode chamber. In the case of alkaline water electrolysis, a porous diaphragm is used as the diaphragm, and in the case of electrolysis of aqueous alkali metal salt solutions, an ion-exchange membrane is used as the diaphragm. The diaphragm is sandwiched between gaskets that are disposed on the surface of a frame which forms the anode chamber and the surface of a frame which forms the cathode chamber, respectively. The gaskets prevent leakage of electrolytes from the anode chamber and the cathode chamber.

For example, as illustrated in Patent Literatures 1 and 2, the diaphragm is larger than the gaskets and thus protrudes outside from the electrolysis cell frame when the diaphragm is held between the anode chamber and the cathode chamber with the gaskets. Although Patent Literatures 1 and 2 specifically show electrolysis of alkali metal salt solutions, the same structure is also used in the case of alkaline water electrolysis. Particularly for large-scale electrolysis cells, the structure described above is used in order to ensure that the diaphragm is held under certain tension.

However, the structure has a disadvantage that gaskets deteriorate with time because highly corrosive alkali solutions are used as electrolytes. Patent Literature 3 proposes a seal structure that can work without replacement of gaskets over along term as a measure to solve this problem.

RELATED ART LITERATURES

Patent Literatures

Patent Literature 1: Japanese Unexamined Patent Application Publication No. 2014-221944
Patent Literature 2: Japanese Unexamined Patent Application Publication No. 2012-193437
Patent Literature 3: Japanese Unexamined Patent Application Publication No. H05-9772

SUMMARY OF THE INVENTION

Problem to be Solved by the Invention

However, even though gaskets are used, the problem of the leakage of aqueous alkali solutions still occurs in alkaline water electrolyzers using porous diaphragms. In general, the leakage can easily occur in large-scale electrolyzers where the chamber frame-fastening surface pressure can often become uneven. At present, the leakage of electrolytes occurs in several days, and further improvement has been required.

It is therefore an object of the present invention to provide an alkaline water electrolyzer in which leakage of aqueous alkali solutions is prevented.

Means for Solving the Problem

As a result of intensive studies to solve the above problems, the inventors have made the following findings. Specifically, the inventors have found that the cause of the leakage of aqueous alkali solutions in alkaline water electrolyzers lies in infiltration of aqueous alkali solutions into porous diaphragms not in deterioration or corrosion of gaskets. As a result of further intensive studies based on the findings, the inventors have accomplished the present invention based on the findings that the above problems can be solved using the structure described below for alkaline water electrolyzers.

Specifically, the present invention is directed to an alkaline water electrolyzer including: an anode chamber frame defining an anode chamber; a cathode chamber frame defining a cathode chamber; an anode accommodated in the anode chamber; a cathode accommodated in the cathode chamber; a porous diaphragm disposed between the anode and cathode chamber frames and partitioning the anode and cathode chambers; an anode gasket disposed on an anode chamber frame surface where the porous diaphragm is disposed; and a cathode gasket disposed on a cathode chamber frame surface where the porous diaphragm is disposed, wherein when the anode chamber frame and the cathode chamber frame are fastened to each other, the porous diaphragm is held between the anode chamber frame and the cathode chamber frame via the anode gasket and the cathode gasket, and the anode gasket and the cathode gasket are in contact with each other around a peripheral edge of the porous diaphragm by compressing the anode gasket and the cathode gasket.

In the electrolyzer of the present invention, the anode gasket and the cathode gasket preferably have the same shape, and the electrolyzer of the present invention preferably satisfies Formulae (1) to (3):

$$A \geq 3 \text{ mm} \quad (1),$$

$$W - A \geq 3 \text{ mm} \quad (2), \text{ and}$$

$$(D - D') \times 2 - T \geq 0.01 \text{ mm} \quad (3)$$

where W represents widths of the anode gasket and the cathode gasket, D represents thicknesses of the anode gasket and the cathode gasket before the compression, D' represents thicknesses of inner annular portions of the anode gasket and the cathode gasket after the compression, A represents a contact width between the porous diaphragm and the anode gasket and the cathode gasket, and T represents a thickness of the porous diaphragm during the compression.

Effects of the Invention

According to the present invention, electrolyte leakage from the edge of the porous diaphragm in the alkaline water electrolyzer can be prevented by simple means.

PREFERRED EMBODIMENTS

Hereinafter, embodiments of the present invention will be described in detail with reference to the drawings.

Figure 1:
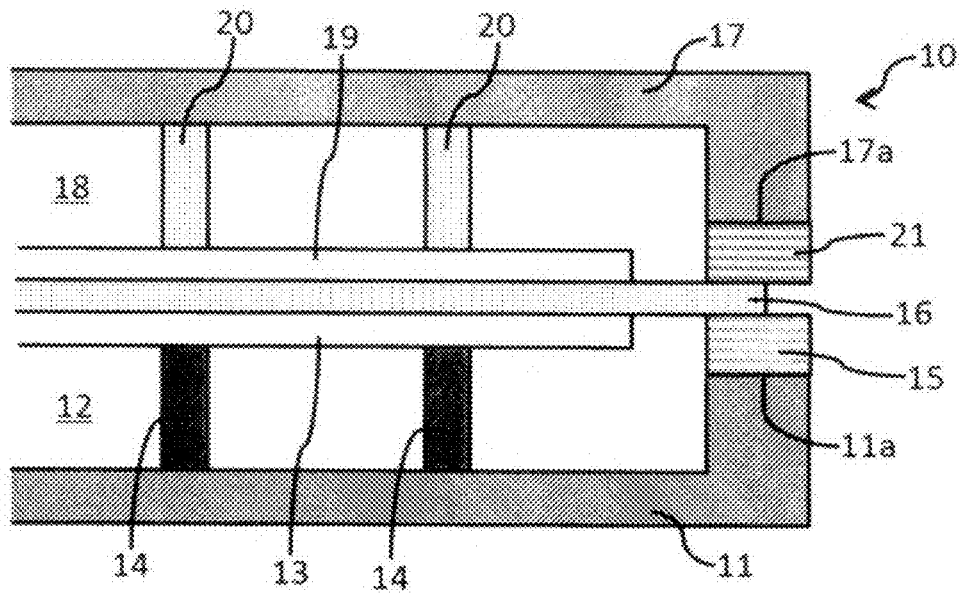
FIG. 1 is a half-sectional view of unfastened anode and cathode chamber frames of an alkaline water electrolyzer according to a preferred embodiment of the present invention.
Figure 2:
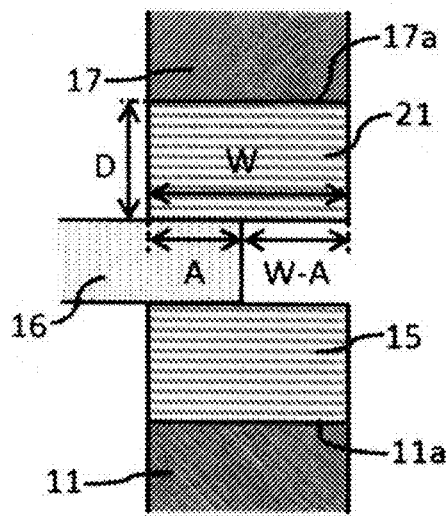
FIG. 2 is an enlarged cross-sectional view of a peripheral edge portion of the porous diaphragm shown in FIG. 1.

FIGS. 1 to 4 are cross-sectional views for illustrating an alkaline water electrolyzer according to a preferred embodiment of the present invention. FIG. 1 illustrates anode and cathode chamber frames in an unfastened state. FIG. 2 is an enlarged cross-sectional view of a peripheral edge portion of the porous diaphragm illustrated in FIG. 1. An alkaline water electrolyzer 10 includes an anode chamber frame 11 defining an anode chamber 12; a cathode chamber frame 17 defining a cathode chamber 18; and a porous diaphragm 16 disposed between the anode chamber frame 11 and the cathode chamber frame 17 and partitioning the anode chamber 12 and the cathode chamber 18. An anode 13 is accommodated in the anode chamber 12. A cathode 19 is accommodated in the cathode chamber 18. In the illustrated example, the anode 13 and the cathode 19 are supported by supports 14 and 20, respectively.

The anode chamber frame 11 and the cathode chamber frame 17 are each a tank with one side opened. Although not shown, a port for supplying an electrolyte and an outlet for discharging an aqueous alkali solution and gas after the electrolysis are provided to each of the anode chamber frame 11 and the cathode chamber frame 17. An anode gasket 15 is disposed on the surface (gasket surface) 11a of the anode chamber frame 11, where the porous diaphragm 16 is disposed. A cathode gasket 21 is also disposed on the surface (gasket surface) 17a of the cathode chamber frame 17, where the porous diaphragm 16 is disposed. Specifically, the anode gaskets 15 and the cathode gasket 21 are each disposed on a flange of each chamber frame. The porous diaphragm 16 is sandwiched between the anode gasket 15 and the cathode gasket 21.

The anode gasket 15 and the cathode gasket 21 have shapes compatible with the gasket surfaces of the anode chamber frame 11 and the cathode chamber frame 17, respectively. For example, if the gasket surfaces are rectangular, the anode gasket 15 and the cathode gasket 21 each have a rectangular frame shape with a rectangular opening at the center. Alternatively, if the gasket surfaces are circular, the anode gasket 15 and the cathode gasket 21 may each have a circular frame shape. The anode gasket 15 and the cathode gaskets 21 may have the same shape and thickness or different shapes and thicknesses. The anode gasket 15 and the cathode gasket 21 are preferably in the form of flat sheets. For the positioning of the porous diaphragm 16, a step may be formed on the surface of each of the gaskets 15 and 21 in contact with the diaphragm 16 in such a manner that an inner peripheral portion of the gasket 15 or 21 is reduced in thickness.

In the present invention, the porous diaphragm 16 is smaller than the outer periphery of the anode gasket 15 and the cathode gasket 21, and larger than the openings of the anode gasket 15 and the cathode gasket 21. Therefore, when the porous diaphragm 16 is sandwiched between the anode gasket 15 and the cathode gasket 21, the edge of the porous diaphragm 16 does not protrude outside from the gaskets 15 and 21. At an inner peripheral portion of each of the anode gasket 15 and the cathode gasket 21 the porous diaphragm 16 and the gaskets 15 and 21 are in contact with each other, whereas an outer peripheral portion of each of the gaskets 15 and 21 is not in contact with the porous diaphragm 16.

Figure 3:
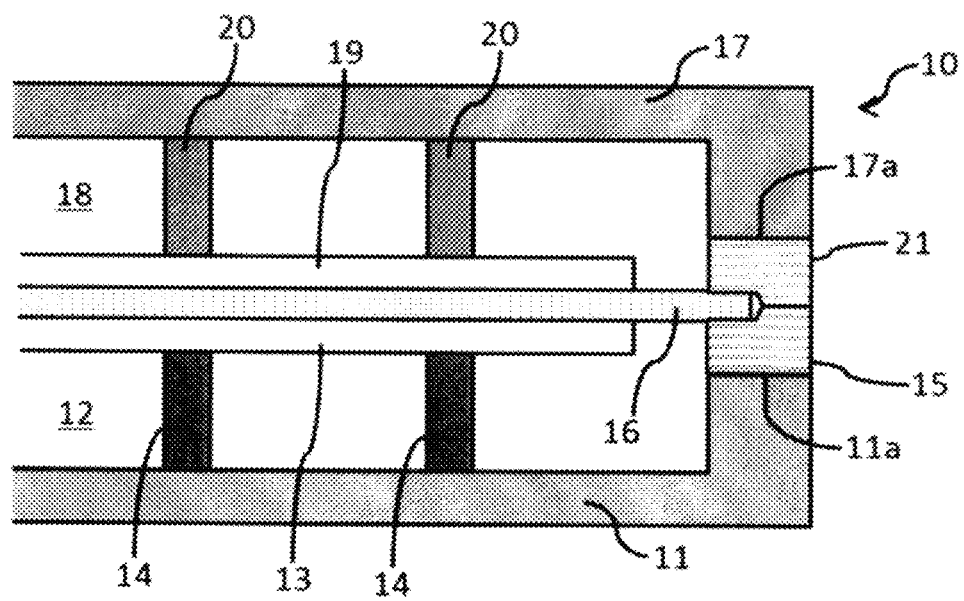
FIG. 3 is a half-sectional view of fastened anode and cathode chamber frames of an alkaline water electrolyzer according to a preferred embodiment of the present invention.
Figure 4:
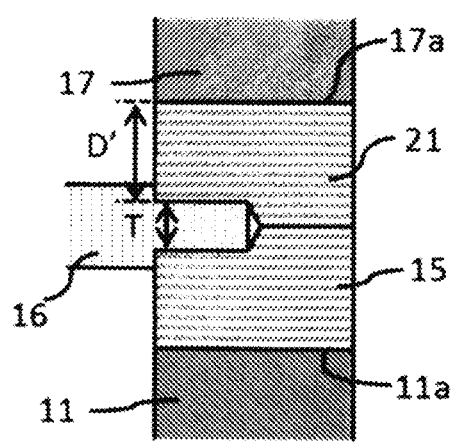
FIG. 4 is an enlarged cross-sectional view of a peripheral edge portion of the porous diaphragm shown in FIG. 3.

FIG. 3 is a cross-sectional view for illustrating an alkaline water electrolyzer according to a preferred embodiment of the present invention. FIG. 3 illustrates anode and cathode chamber frames in a fastened state. FIG. 4 is an enlarged cross-sectional view of a peripheral edge portion of the porous diaphragm illustrated in FIG. 3. In the alkaline water electrolyzer 10 of the present invention, when the anode chamber frame 11 and the cathode chamber frame 17 are fastened to each other as illustrated in FIGS. 3 and 4, the porous diaphragm 16 is held between the anode and cathode chamber frames 11 and 17 via the anode gaskets 15 and the cathode gasket 21. At this time, the anode gasket 15 and the cathode gasket 21 are compressed and deformed so that the outer peripheral portions of the anode gasket 15 and the cathode gasket 21 come into contact with each other. Thus, the outer side of the peripheral edge of the porous diaphragm 16 is surrounded by each of the gaskets 15 and 21, so that the anode chamber 12 and the cathode chamber 18 are kept liquid-tight by the anode gasket 15 and the cathode gasket 21 when filled with an electrolyte.

In a conventional alkaline water electrolyzer equipped with a porous diaphragm, when an anode chamber and a cathode chamber are filled with an electrolyte (aqueous alkali solution), the aqueous alkali solution infiltrates into the porous diaphragm and leaks to the outside from its edge. In the alkaline water electrolyzer 10 of the present invention, the anode gasket 15 and the cathode gasket 21 are brought into contact with each other around the peripheral edge of the porous diaphragm 16 to keep the liquid tightness when the anode chamber frame 11 and the cathode chamber frame 17 are fastened to each other, so that the aqueous alkali solution is prevented from leaking to the outside.

As illustrated in FIG. 2, the widths of the anode gasket 15 and the cathode gasket 21 (gasket widths) are denoted by W, and the contact width between the porous diaphragm 16 and the anode gasket 15 and the cathode gasket 21 is denoted by A. The contact width satisfies A≥3 mm (Formula (1)) in order to hold the porous diaphragm 16 between the respective gaskets 15 and 21. On the other hand, an increase in A will lead to an increase in the flange width of the anode chamber frame 11 and the cathode chamber frame 17. The upper limit of the contact width A is determined as appropriate taking into account the area required to install the alkaline water electrolyzer 10 and other factors.

The difference W−A between the gasket width W and the contact width A corresponds to the margin for contact between the anode gasket 15 and the cathode gasket 21. In order to bring the anode gasket 15 and the cathode gasket 21 into contact with each other, the anode gasket 15 and the cathode gasket 21 should be larger than the porous diaphragm 16. The margin for contact between the gaskets preferably satisfies W−A≥3 mm (Formula (2)) in view of positioning accuracy and workability during the placement of the gaskets and in order to keep the liquid tightness around the peripheral edge of the porous diaphragm 16 by bringing the anode gasket 15 and the cathode gasket 21 into contact with each other. A larger margin W−A for contact between the gaskets will provide a larger contact area between the anode gasket 15 and the cathode gasket 21, and thus ensure more reliable liquid tightness. However, an increase in W−A will lead to an increase in the area required to install the alkaline water electrolyzer 10. Therefore, the upper limit of the margin W−A for contact is determined as appropriate taking into account electrolyte leakage, installation area, and other factors.

As illustrated in FIG. 2, the thicknesses of the uncompressed anode gasket 15 and cathode gasket 21 are denoted by D. In addition, as illustrated in FIG. 4, the thicknesses of the compressed inner peripheral portions of the anode gasket 15 and the cathode gasket 21 are denoted by D', and the thickness of the compressed porous diaphragm 16 is denoted by T. In the present invention, Formula (3):

$$(D-D')\times 2-T \geq 0.01 \text{ mm} \quad (3)$$

is preferably satisfied in addition to Formulae (1) and (2) in order to prevent electrolyte leakage.

The pressure (fastening surface pressure) on the anode gasket 15 and the cathode gasket 21 is controlled so that a compression amount satisfying Formula (3) can be obtained. If the gasket width W is constant, there will be a relationship, as described below, between electrolyte leakage and the margin W−A for contact between the gaskets. As the margin W−A for contact between the gaskets increases, the contact width A decreases, and the pressure-receiving areas of the gaskets decrease. This increases the pressure (gasket surface pressure) on the anode gasket 15 and the cathode gasket 21 when the anode chamber frame 11 and the cathode chamber frame 17 are fastened to each other, and also increases the amount of compression of the anode gasket 15 and the cathode gaskets 21. Thus, electrolyte leakage can be prevented even when the fastening surface pressure is low. On the other hand, as the margin W−A for contact between the gaskets decreases, the contact width A increases, and the pressure-receiving areas of the gaskets increase. This decreases the pressure (gasket surface pressure) on the anode gasket 15 and the cathode gasket 21 when the anode chamber frame 11 and the cathode chamber frame 17 are fastened to each other, and also decreases the amount of compression of the anode gasket 15 and the cathode gasket 21. Therefore, the fastening surface pressure should be increased to a certain extent in order to prevent electrolyte leakage.

The alkaline water electrolyzer 10 of the present invention may have known features, except for the arrangement relation of the anode gasket 15 and the cathode gasket 21 with the porous diaphragm 16 and the placement with the anode gasket 15 and the cathode gasket 21 surrounding the peripheral edge of the porous diaphragm 16.

In the alkaline water electrolyzer 10 of the present invention, the porous diaphragm 16 may be a commonly available diaphragm for alkaline water electrolysis. Such a diaphragm for alkaline water electrolysis is a porous membrane including a sheet-shaped porous support and an organic polymer resin with which the support is impregnated. The support is a nonwoven fabric, a woven fabric, or a composite of nonwoven and woven fabrics. The support is made of fibers of at least one selected from the group consisting of polyphenylene sulfide, polypropylene, polysulfone, polyether sulfone, polyphenyl sulfone, fluororesin, polyketone, polyimide, and polyether imide. The organic polymer resin includes at least one selected from the group consisting of polysulfone, polyether sulfone, polyphenyl sulfone, polyvinylidene fluoride, polycarbonate, polytetrafluoroethylene, polypropylene, polyphenylene sulfide, polyketone, polyether ether ketone, polyimide, and polyether imide.

In the alkaline water electrolyzer 10 of the present invention, the anode gasket 15 and the cathode gasket 21 may be, for example, frame-shaped rubber sheets. The anode gasket 15 and the cathode gasket 21 are required to have resistance to, for example, corrosive electrolytes and generated gases, and also required to be workable for a long term. In view of chemical resistance and hardness, therefore, the anode gasket 15 and the cathode gasket 21 are preferably made of, for example, vulcanized or peroxide-crosslinked ethylene-propylene-diene rubber (EPDM) or ethylene-propylene rubber (EPM). If necessary, the gasket to be used may also be covered with fluororesin such as polytetrafluoroethylene (PTFE) or tetrafluoroethylene-perfluoroalkyl vinyl ether copolymer (PFA) at its region to be in contact with liquids (liquid contact portion). The thicknesses of the anode gasket 15 and the cathode gasket 21 are, for example, from about 1 mm to about 4 mm.

In the alkaline water electrolyzer 10 of the present invention, the anode 13 and the cathode 19 each preferably include a conductive substrate and a catalyst layer provided on the substrate.

FIGS. 1 to 4 show an alkaline water electrolyzer with a single unit structure including a pair of anode and cathode chamber frames. It will be understood that such a structure is not intended to limit the present invention. The present invention may also be applied to an alkaline water electrolyzer having a plurality of units, which can be formed by integrating one unit of anode chamber frame and another unit of cathode chamber frame.

The alkaline water electrolyzer 10 of the present invention is particularly suitable for use as a large-scale alkaline water electrolyzer in which the fastening surface pressure can often become uneven and electrolyte leakage can easily occur. As used herein, the term "large-scale alkaline water electrolyzer" refers to one with an electrode area of 3 $m^2$ or more.

When alkaline water electrolysis is performed using the alkaline water electrolyzer 10 of the present invention, a direct current is applied between the anode 13 and the cathode 19 in the anode and cathode chambers 12 and 18 whose interiors are filled with an electrolyte. The electrolyte may be, for example, an aqueous alkali solution such as sodium hydroxide or potassium hydroxide. The concentration of the aqueous alkali solution is preferably, but not limited to, 15 to 40% by mass, more preferably 20 to 35% by mass. When the concentration falls within the range of 15 to 40% by mass, the solution can have a sufficient level of ionic conductivity and a low level of electric resistance.

The temperature during the electrolysis of the aqueous alkali solution is preferably, but not limited to, 40° C. to 90° C., more preferably 60° C. to 90° C. In these temperature ranges, the solution can have a sufficient level of ionic conductivity, so that the aqueous alkali solution can be electrolyzed efficiently.

EXAMPLES

Hereinafter, examples of the present invention will be described in detail. It will be understood that the examples are only illustrative for the purpose of clearly describing the present invention and are not intended to limit the present invention in any way.

An alkaline water electrolyzer with an electrolysis area of 1 $dm^2$ (10 cm×10 cm) was built by fastening anode and cathode chamber frames between which a diaphragm for alkaline water electrolysis was held via anode and cathode gaskets. The material, dimensions and fastening conditions of the gaskets are as follows.

Specifications of Gaskets:
  Outer dimensions: 150 mm×150 mm
  Inner dimensions: 104 mm×104 mm (corresponding to the dimensions of the gasket opening)
  Gasket width (denoted by letter W in FIG. 2): 23 mm
  Thickness: 3 mm
  Material: EPDM
Margin for contact between gaskets (corresponding to W−A): 0, 3, 5, 10, 15, or 20 mm
Gasket fastening surface pressure: 10 to 50 kgf/cm$^2$ The anode and cathode chambers were filled with a 25% by mass KOH aqueous solution. The pressure conditions in the anode and cathode chambers were set at 2,000 mmH$_2$O so that possible leakage of the solution from the porous diaphragm could be accelerated. After this state was kept for 15 minutes, whether the KOH aqueous solution leaked from the peripheral edges of the gaskets was determined visually and using pH test papers. Table 1 shows whether or not leakage occurs with respect to the parameters: the margin for contact between the gaskets; and the gasket surface pressure.

TABLE 1

| | | Gasket surface pressure (kgf/cm$^2$) | | | | | | | |
|---|---|---|---|---|---|---|---|---|---|
| | | 10 | 15 | 20 | 25 | 30 | 35 | 40 | 50 |
| Margin for contact between gaskets (W − A) | 0 mm | Leakage | Leakage | Leakage | Leakage | Leakage | Leakage | Leakage | Leakage |
| | 3 mm | Leakage | Leakage | Leakage | Leakage | Leakage | No leakage | No leakage | No leakage |
| | 5 mm | Leakage | Leakage | Leakage | Leakage | No leakage | No leakage | No leakage | No leakage |
| | 10 mm | Leakage | No leakage | No leakage | No leakage | No leakage | No leakage | No leakage | No leakage |
| | 15 mm | No leakage | No leakage | No leakage | No leakage | No leakage | No leakage | No leakage | No leakage |
| | 20 mm | No leakage | No leakage | No leakage | No leakage | No leakage | No leakage | No leakage | No leakage |

When the margin for contact between the gaskets was 0 mm (W−A=0), leakage of the KOH aqueous solution was observed even at higher surface pressures. Under such conditions, it was also visually observed that the peripheral edge of the porous diaphragm was not surrounded by the anode and cathode gaskets.

Conditions capable of preventing the leakage of the KOH aqueous solution were found when the margin W−A for contact between the gaskets was 3 mm or more. It is apparent that the leakage of the KOH aqueous solution can be prevented by controlling the gasket surface pressure.

Table 1 shows that as the margin W−A for contact between the gaskets is increased, the leakage can be prevented even at lower gasket surface pressures.

The amount of compression of each gasket (corresponding to D−D' in Formula (3)) and the thickness of the porous diaphragm after the compression were calculated under the conditions of the margin for contact between the gaskets and the gasket surface pressure shown in Table 1. Table 2 shows the left-side value (D−D')×2−T (in units of mm) of Formula (3) under each set of conditions.

TABLE 2

| | | Gasket surface pressure (kgf/cm$^2$) | | | | | | | |
|---|---|---|---|---|---|---|---|---|---|
| | | 10 | 15 | 20 | 25 | 30 | 35 | 40 | 50 |
| Margin for contact between gaskets (W − A) | 0 mm | −0.16 | −0.13 | −0.11 | −0.09 | −0.07 | −0.05 | −0.02 | 0.02 |
| | 3 mm | −0.14 | −0.11 | −0.08 | −0.05 | −0.02 | 0.01 | 0.04 | 0.10 |
| | 5 mm | −0.12 | −0.09 | −0.05 | −0.01 | 0.03 | 0.07 | 0.10 | 0.18 |
| | 10 mm | −0.05 | 0.03 | 0.10 | 0.18 | 0.25 | 0.33 | 0.40 | 0.55 |
| | 15 mm | 0.16 | 0.34 | 0.53 | 0.71 | 0.89 | 1.07 | 1.25 | 1.61 |
| | 20 mm | 0.85 | 1.38 | 1.91 | 2.43 | 2.96 | 3.49 | 4.01 | 5.07 |

A comparison between Tables 1 and 2 shows that the leakage can be prevented when (D−D')×2−T is positive or at least 0.01 mm and that the electrolyte leaks when (D−D')×2−T is negative. The results in Tables 1 and 2 suggest that the leakage of the electrolyte can be prevented under conditions satisfying (D−D')×2−T≥0.01 mm. It was found that there is a similar tendency to that shown in Tables 1 and 2 even when the porous diaphragm type is changed.

DESCRIPTION OF THE REFERENCE NUMERALS

10 Alkaline water electrolyzer
11 Anode chamber frame
11a Anode chamber frame surface
12 Anode chamber
13 Anode
14 Support
15 Anode gasket
16 Porous diaphragm
17 Cathode chamber frame
17a Cathode chamber frame surface
18 Cathode chamber
19 Cathode
20 Support
21 Cathode gasket

The invention claimed is:

1. An alkaline water electrolyzer comprising:
an anode chamber frame defining an anode chamber;
a cathode chamber frame defining a cathode chamber;
an anode accommodated in the anode chamber;
a cathode accommodated in the cathode chamber;
a porous diaphragm disposed between the anode and cathode chamber frames and partitioning the anode and cathode chambers;
an anode gasket disposed on an anode chamber frame surface where the porous diaphragm is disposed; and
a cathode gasket disposed on a cathode chamber frame surface where the porous diaphragm is disposed;
wherein
when the anode chamber frame and the cathode chamber frame are fastened to each other, the porous diaphragm is held between the anode chamber frame and the cathode chamber frame via the anode gasket and the cathode gasket and the anode gasket and the cathode gasket are in contact with each other around a peripheral edge of the porous diaphragm by compressing the anode gasket and the cathode gasket;
wherein
the anode gasket and the cathode gasket have a same shape; and
wherein
the alkaline water electrolyzer satisfies Formulae (1) to (3) below:

$$A \geq 3 \text{ mm} \tag{1}$$

$$W - A \geq 3 \text{ mm} \tag{2, and}$$

$$(D-D') \times 2 - T \geq 0.01 \text{ mm} \tag{3}$$

wherein
W represents widths of the anode gasket and the cathode gasket,
D represents thicknesses of the anode gasket and the cathode gasket before the compression,
D' represents thicknesses of inner peripheral portions of the anode gasket and the cathode gasket after the compression,
A represents a contact width between the porous diaphragm and the anode gasket and the cathode gasket, and
T represents a thickness of the porous diaphragm during the compression.

* * * * *